United States Patent
Wang et al.

(10) Patent No.: US 9,961,690 B2
(45) Date of Patent: May 1, 2018

(54) METHOD AND BASE STATION FOR SELECTING A TRANSPORT FORMAT

(71) Applicant: Telefonaktiebolaget L M Ericsson (publ), Stockholm (SE)

(72) Inventors: Liping Wang, Sollentuna (SE); Ying Sun, Sundbyberg (SE); Jinghong Yang, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 14/761,198

(22) PCT Filed: Jun. 26, 2015

(86) PCT No.: PCT/SE2015/050752
§ 371 (c)(1),
(2) Date: Jul. 15, 2015

(87) PCT Pub. No.: WO2016/209135
PCT Pub. Date: Dec. 29, 2016

(65) Prior Publication Data
US 2017/0142733 A1 May 18, 2017

(51) Int. Cl.
*H04W 72/08* (2009.01)
*H04W 72/04* (2009.01)
*H04L 5/00* (2006.01)

(52) U.S. Cl.
CPC ........... *H04W 72/082* (2013.01); *H04L 5/006* (2013.01); *H04W 72/0413* (2013.01)

(58) Field of Classification Search
CPC ....... H04L 1/0026; H04L 1/0003; H04L 1/20; H04W 52/146; H04W 52/241
See application file for complete search history.

(56) References Cited

U.S. PATENT DOCUMENTS

2010/0284454 A1* 11/2010 Oteri .................. H03M 13/353
                                                             375/224
2012/0275413 A1* 11/2012 Hong .................. H04L 5/0041
                                                             370/329
(Continued)

FOREIGN PATENT DOCUMENTS

EP        1928115 A1    6/2008
WO    2008093964 A2    8/2008

OTHER PUBLICATIONS

Samsung, "R1-090612: Control Signaling for Non-Contiguous UL Resource Allocations," 3rd Generation Partnership Project (3GPP), TSG RAN WG1 #56, Feb. 9-13, 2009, 5 pages, Athens, Greece.

(Continued)

*Primary Examiner* — Jung Park
(74) *Attorney, Agent, or Firm* — Withrow & Terranova, PLLC (57) ABSTRACT

A method in a base station for selecting a transport format is provided. The base station allocates resources to a User Equipment, UE.
When a first criterion is fulfilled for the allocated resources, the base station estimates Signal-to-Interference-plus-Noise Ratio, SINR, by using a first gain offset. The first gain offset relates to a resource allocation according to the first criterion.
When a second criterion is fulfilled for the allocated resources, the base station estimates SINR by using a second gain offset. The second gain offset relates to a resource allocation according to the second criterion.
The base station then selects a transport format for the allocated resources based on the estimated SINR.

15 Claims, 8 Drawing Sheets

(56) References Cited

U.S. PATENT DOCUMENTS

| | | | | |
|---|---|---|---|---|
| 2013/0310092 A1* | 11/2013 | Tabet | .................... | H04L 1/0003 |
| | | | | 455/501 |
| 2013/0322276 A1* | 12/2013 | Pelletier | .............. | H04W 72/085 |
| | | | | 370/252 |
| 2014/0369283 A1* | 12/2014 | Ge | ....................... | H04B 7/0452 |
| | | | | 370/329 |
| 2015/0181534 A1* | 6/2015 | Andersson | ............ | H04L 1/0015 |
| | | | | 370/311 |
| 2016/0345298 A1* | 11/2016 | Frank | .................. | H04W 52/146 |

OTHER PUBLICATIONS

Samsung, "R1-101151: Non-Contiguous UL Resource Allocation: Throughput Performance;" 3rd Generation Partnership Project (3GPP), TSG RAN WG1 #60, Feb. 22-26, 2010, 7 pages, San Francisco, USA.

International Search Report and Written Opinion for PCT/SE2015/050752, dated Oct. 23, 2015, 10 pages.

\* cited by examiner

METHOD AND BASE STATION FOR SELECTING A TRANSPORT FORMAT

This application is a 35 U.S.C. § 371 national phase filing of International Application No. PCT/SE2015/050752, filed Jun. 26, 2015, the disclosure of which is incorporated herein by reference in its entirety.

TECHNICAL FIELD

Embodiments herein relate to a base station and a methods therein. In particular, they relate to selecting a transport format.

BACKGROUND

Wireless devices or terminals for communication are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE is controlled by the radio base station.

An uplink multiple access scheme for LTE is Single Carrier Frequency Division Multiple Access (SC-FDMA), also known as Discrete Fourier Transform (DFT) Spread-Orthogonal Frequency Division Multiplexing (S-OFDM), where assigned Resource Blocks (RBs) should be contiguous in the frequency domain. SC-FDMA has a significantly lower Peak-to-Average-Power-Ratio (PAPR), also known as Cubic Metric (CM), and therefore avoids excessive cost of transmitters in UEs. Further enhancements for non-contiguous resource allocation in the uplink have been introduced in LTE-Advanced. Contiguous resource allocation means that the allocated resource blocks are contiguous in the frequency domain, whereas non-contiguous resource allocation means that the allocated resource blocks are not contiguous in the frequency domain. When using clustered DFT-S-OFDM with a maximum of two clusters, Physical Uplink Shared Channel (PUSCH) transmission on two separate contiguous sets of RBs within a single component carrier can be supported. Cluster is defined herein as a group of contiguous resource blocks. Clustered DFT-S-OFDM uses a single DFT operation as SC-FDMA and changes a resource element mapping at an output of DFT from a single cluster to a multiple clusters of subcarriers. This results in that the resulting waveform is no longer 'single-carrier' but still has a low PAPR or CM. Such dual-clustered PUSCH transmission increases the flexibility of uplink resource allocation and thus can maximize the utilization of the spectrum.

On the other hand, Link Adaptation (LA) and Hybrid Automatic Repeat reQuest (HARQ) are two features that enable efficient and robust data transmission in wireless communication systems. With LA, a transport formats such as e.g. a Modulation and Coding Scheme (MCS) can be adapted to current channel conditions. For instance, when a UE experiences poor radio conditions, it can use a low order MCS, e.g. Quadrature Phase Shift Keying (QPSK) with coding rate 1/6, to achieve robustness against the noise and the channel fades, whereas with a highly reliable channel, the UE may use high order MCSs, such as e.g. 64-Quadrature Amplitude Modulator (QAM) with coding rate 5/6, to improve its throughput. Coding rate 1/6 and 5/6 here mean the ratio between the information bits and the physical channel bits, which are the actual bits transmitted via the physical channel and include the information and also the redundancy used for error correction. Higher coding rate means less redundancy and thus higher spectrum efficiency. In uplink, the eNodeB needs to estimate the Signal-to-Interference-plus-Noise Ratio (SINR) of UEs according to a previously received PUSCH message or Sounding Reference Signal (SRS). The eNodeB then selects the MCS leading to higher expected throughput with respect to a predefined BLock Error Rate (BLER) target, typically set as 10 percent in LTE. An index of the selected MCS is then sent back to UEs via uplink grants in PDCCH. With HARQ, a Cyclic Redundancy Code (CRC) is appended to the information bits of each code word. Code word may be seen as a group of bits that should be transmitted and decoded together. It comprises the information bits and an CRC. The CRC is an error-detecting code that is used for determining if the code word can be correctly decoded. and used to check if the transmission is successful. In case of correct detection which means the CRC is ok, i.e. the code word is correctly decoded, an Acknowledgment (ACK) message is sent to the UE; otherwise, a Negative ACK (NACK) message is sent to the UE, and the UE has to retransmit the code word.

CRC for uplink transmissions can be used to control LA margin to compensate for systematic errors in SINR estimation for link adaptation. The process is also referred to as an outer loop gain adjustment. With outer loop gain adjustment, link adaptation becomes more aggressive, i.e. the LA chooses higher modulation order and/or coding rate and may get higher Block Error Rate (BLER) than the target one, when a CRC is ok and more defensive when a CRC is not ok.

With the support of clustered DFT-S-OFDM, an uplink scheduler in an eNodeB may dynamically assign contiguous or non-contiguous RBs, i.e. two clusters of RBs, to UEs based on their buffer requirements, channel quality measurements and scheduling strategies. The estimated SINR is an important input for Link Adaptation. The problem in this case is that the estimated SINR is inaccurate. If the accuracy on SINR estimation is lost, the Link Adaptation function will choose an improper MCS based on the estimated SINR, which further may results in higher block error rate or less throughput.

SUMMARY

It is therefore an object of embodiments herein to improve the performance for a UE supporting both contiguous and non-contiguous resources.

According to a first aspect of embodiments herein, the object is achieved by a method performed by a base station for selecting a transport format. The base station allocates resources to a User Equipment, UE.

When a first criterion is fulfilled for the allocated resources, the base station estimates Signal-to-Interference-plus-Noise Ratio, SINR, by using a first gain offset. The first gain offset relates to a resource allocation according to the first criterion.

When a second criterion is fulfilled for the allocated resources, the base station estimates SINR by using a second gain offset. The second gain offset relates to a resource allocation according to the second criterion.

The base station then selects a transport format for the allocated resources based on the estimated SINR.

According to a second aspect of embodiments herein, the object is achieved by a base station for selecting a transport format. The base station is configured to allocate resources to a User Equipment, UE.

The base station is further configured to, when a first criterion is fulfilled for the allocated resources, estimate Signal-to-Interference-plus-Noise Ratio, SINR, by using a first gain offset. The first gain offset relates to a resource allocation according to the first criterion.

The base station is further configured to when a second criterion is fulfilled for the allocated resources, estimate SINR by using a second gain offset. The second gain offset relates to a resource allocation according to the second criterion.

The base station is further configured to select a transport format for the allocated resources based on the estimated SINR.

An advantage with embodiments herein is that they provide more accurate SINR estimation for UEs that support both one-clustered and dual-clustered PUSCH transmissions, and thus improve the cell throughput and the quality-of-service of these UEs.

BRIEF DESCRIPTION OF THE DRAWINGS

Examples of embodiments herein are described in more detail with reference to attached drawings in which.

DETAILED DESCRIPTION

As a part of developing embodiments herein, a problem will first be identified and discussed.

As mentioned above CRC for uplink transmissions can be used to control LA margin to compensate for systematic errors in SINR estimation for link adaptation. The process is also referred to as an outer loop gain adjustment. With outer loop gain adjustment, link adaptation becomes more aggressive, i.e. the LA chooses higher modulation order and/or coding rate and may get higher BLER than the target one, when a CRC is ok and more defensive when a CRC is not ok. Commonly, one outer loop gain adjustment is used for one UE in the uplink.

With the support of clustered DFT-S-OFDM, an uplink scheduler in an eNodeB may dynamically assign contiguous or non-contiguous RBs, i.e. two clusters of RBs, to UEs based on their buffer requirements, channel quality measurements and scheduling strategies. In this case, using one outer loop gain adjustment for a UE that can support both one-clustered and dual-clustered PUSCH transmissions may lose accuracy on SINR estimation since the two transmission strategies will consider different parameters for Maximum Power Reduction (MPR), and may experience different power setting and channel quality measurement errors. The estimated SINR is an important input for Link Adaptation. If the accuracy on SINR estimation is lost, the Link Adaptation function will choose an improper MCS based on the estimated SINR, which further may results in higher block error rate or less throughput.

According to embodiments herein, SINR is estimated by using different gain offsets for different types of allocated resources such as e.g. contiguous and non-contiguous allocated resources, and different gain adjustment for different types of allocated resources.

Figure 1:
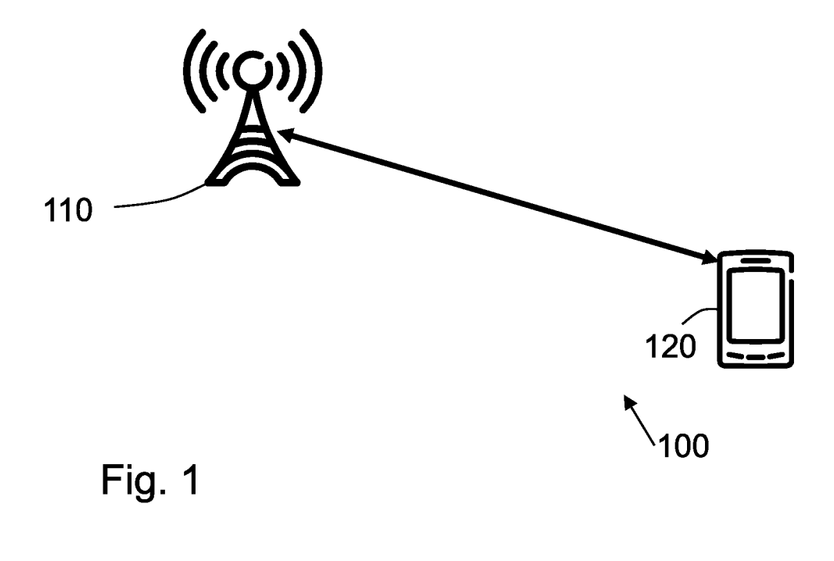
FIG. 1 is a schematic block diagram illustrating embodiments of a communications network.

FIG. 1 depicts an example of a wireless communications network 100 in which embodiments herein may be implemented. The wireless communications network 100 may be a wireless communication network such as an LTE, WCDMA, GSM network, any 3GPP cellular network, or any cellular network or system.

A plurality of base stations operate in the wireless communications network 100 whereof one, a base station 110 is depicted in FIG. 1. The base station 110 may for example be an eNodeB, a NodeB, a Home Node B, a Home eNode B, or any other network node capable to serve a UE in a wireless communications network.

A UE 120 operates in the wireless communications network 100. The UE 120 is served by the base station 110.

The UE 120 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note that the term UE used in this document also covers other wireless devices such as Machine to machine (M2M) devices.

According to embodiments herein, the SINR estimation error is monitored by separate outer loop gain adjustment processes for different types of allocated resources in the uplink to improve accuracy without introducing much more complexity. This means for example that the type of outer loop gain adjustment process to use depends on whether the UE 120 is assigned with contiguous or non-contiguous of RBs.

Figure 2:
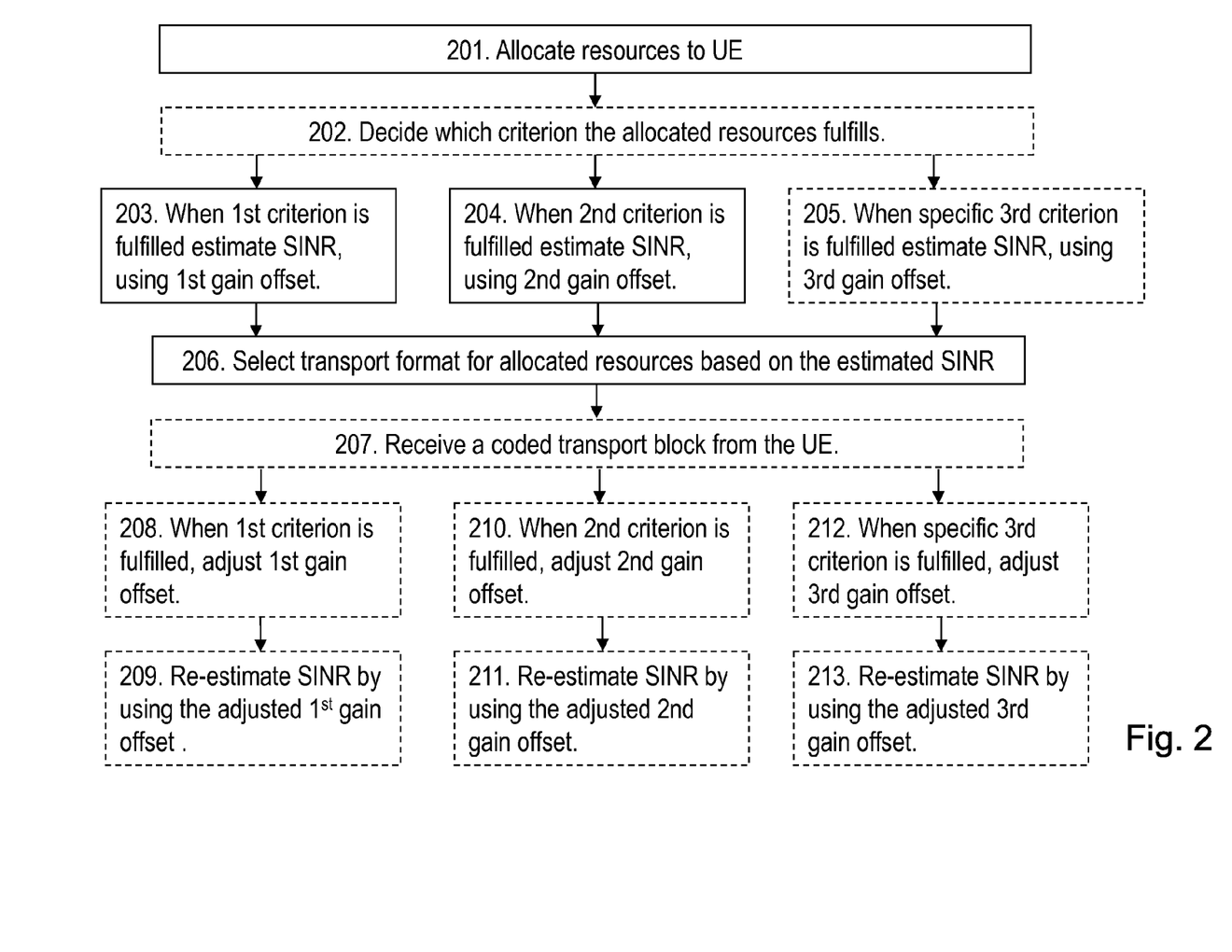
FIG. 2 is a flowchart depicting embodiments of a method in a base station.

Example embodiments of a method performed by the base station 110 for selecting a transport format, will be described with reference to a flowchart depicted in FIG. 2. The transport format e.g. comprises which MCS to use.

The method comprises the following actions, which actions may be taken in any suitable order.

Action 201

There is data that is to be sent from the UE 120. Therefore the base station 110 allocates resources to the UE 120.

Action 202

This action is optional. According to some embodiments, the base station 110 would like to know which type out of multiple types of resources the UE 120 will use for the data transmission. To see that the base station 110 checks which one of multiple criterion that is fulfilled where each criteria is associated with one type out of the multiple types of resources. In an example scenario the UE 120 is assigned with contiguous RBs for the data transmission, then a first criterion is fulfilled. In another example scenario the UE 120 is assigned with non-contiguous of RBs for the data transmission then a second criterion is fulfilled. For instance, if the UE is allocated with RBs with indices from 10 to 20, the base station 110 decides that the first criterion is fulfilled, whereas if the UE 120 is allocated with RBs with indices from 12 to 27 and from 36 to 43, the base station 110 can decide that the second criterion is fulfilled. This information about which type of resources based on which criterion that is fulfilled, will be used later on for selecting an appropriate process for estimating SINR according to the established type of resources. Thus, the base station 110 decides which one out of a multiple criterion the allocated resources fulfills. The criterion may also consider the distance between the clusters. For instance, the second criteria may further be split into two criterion, then there are totally three criterion, e.g. see the following example. The first criterion is the same as mentioned above, which is defined as when the allocation is contiguous. The second criterion is defined as when non-contiguous RBs are allocated, if the distance between the clusters is less than e.g. 8 RBs'. The third criterion is defined as when non-contiguous RBs are allocated if the distance between the clusters is equal or larger than e.g. 8 RBs'. For example, if the UE 120 is allocated with RBs with indices from 12 to 27 and from 36 to 43, the third criteria is fulfilled. The multiple criterion comprises at least a first criterion and a second criterion. In some embodiments there are more than two different criterion that may be fulfilled. In these embodiments the multiple criterion further comprises one or more third criterion. Besides the distance between the two clusters, the criterion may also consider for instance the number of totally allocated resource blocks.

Action 203

When the first criterion is fulfilled for the allocated resources, the base station 110 estimates SINR by using a first gain offset. The first gain offset relates to a resource allocation according to the first criterion. This will be further explained below. Offset is in this document defined as an adjustment made of the estimated SINR.

The first criterion may relate to the allocated resources being contiguous, and the first gain offset may then relate to contiguous resource allocation.

The estimation of SINR will be further explained below.

Action 204

When a second criterion is fulfilled for the allocated resources, the base station 110 estimates SINR by using a second gain offset, which second gain offset relates to a resource allocation according to the second criterion.

The second criterion may relate to the allocated resources being non-contiguous, and the second gain offset may then relate to non-contiguous resource allocation.

In some embodiments, the resource allocation is associated with a parameter. The parameter may relate to any one or more out of: the amount of allocated resources and a distance of clusters in the allocated resources. In these embodiments, the second criterion is fulfilled when the value of the parameter exceeds a threshold.

This will be further explained below.

Action 205

This action is optional. In some embodiments, when a specific third criteria out of the one or more third criterion is fulfilled for the allocated resources, the base station 110 estimates SINR by using a specific third gain offset. The specific third gain offset relates to a resource allocation according to the specific third criterion. Please note that also more than three criteria may be used.

Action 206

The base station 110 then selects a transport format for the allocated resources based on the estimated SINR. A transport format defines how the transport blocks should be transmitted, which e.g. includes information about the MCS, the number of PRB allocated and the antenna mapping.

The selected a transport format is then sent to the UE 120. By basing the selection of transport format on a SINR estimation that is adapted to the specific type of resources that the UE 120 will use for the data transmission, it is possible to select a more accurate transport format for the specific UE 120, thus to improve the UE's throughput.

Action 207

This action is optional. When the data transmission has started the base station 110 receives the data e.g. in one or more transport blocks according to the selected a transport format. The base station 110 thus receives a coded transport block from the UE 120. The coded transport block relates to the allocated resources.

Action 208

This action is optional. In some advantageously embodiments, the base station 110 adjusts the gain offset when the data transmission has been received has started. When the first criterion is fulfilled, the base station 110 adjusts the first gain offset based on whether or not the coded transport block is correctly decoded. This will be further explained below.

Action 209

This action is optional. The base station 110 may then re-estimate SINR by using the adjusted first gain offset. This will be further explained below.

The specific adjusted gain offset can better tract the channel quality variation in different cases, thus improve the accuracy of the estimated SINR.

Action 210

This action is optional. When the second criterion is fulfilled, the base station 110 may adjust the second gain offset, based on whether or not the coded transport block is correctly decoded.

Action 211

This action is optional. The base station 110 may then re-estimate SINR by using the adjusted second gain offset.

Action 212

This action is optional. When the specific third criteria out of the one or more third criterion is fulfilled for the allocated resources, the base station 110 may adjust the specific third gain offset based on whether or not the coded transport block is correctly decoded.

Action 213

This action is optional. The base station 110 may then re-estimate SINR by using the adjusted specific third gain offset.

Embodiments herein will now be further described and explained. The text below is applicable to and may be combined with any suitable embodiment described above.

Figure 3:
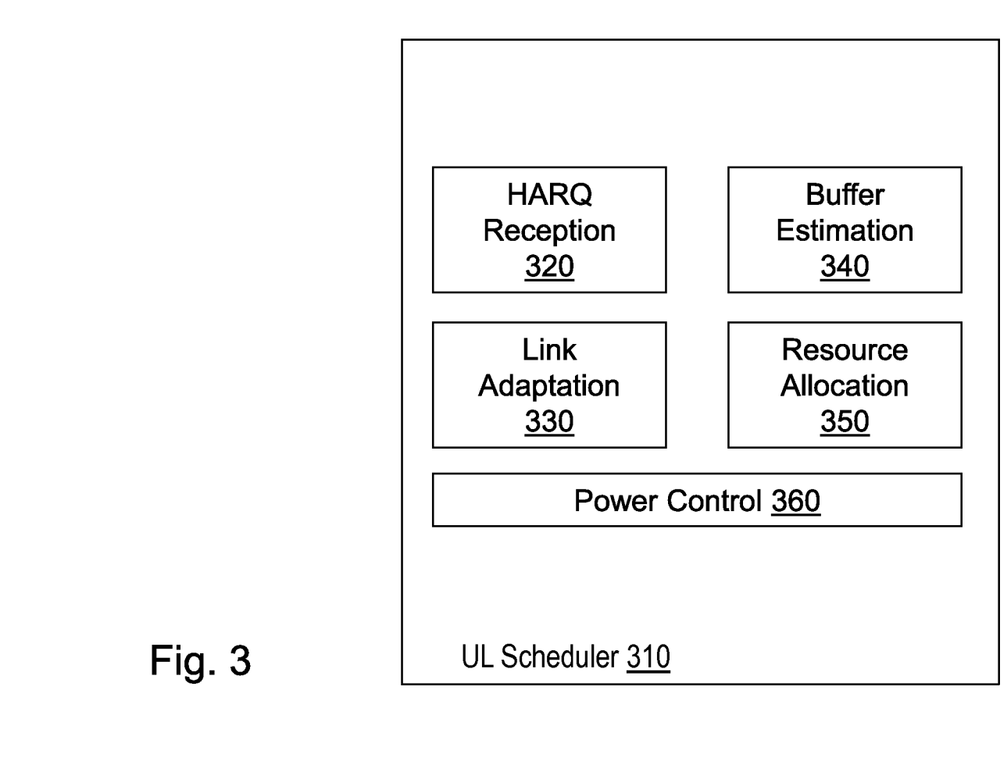
FIG. 3 is a schematic block diagram illustrating embodiments of a scheduler in the base station.

An example of some important functions of an UL scheduler 310 in the base station 110 are shown in FIG. 3. The UL scheduler 310 schedules resources for data transmissions such as the resources for the data transmission from the UE 120.

The UL scheduler 310 further comprises a HARQ reception function 320. The HARQ reception function 320 handles the HARQ retransmission process. This function may e.g. check if a retransmission is needed. Further, it may check if a HARQ retransmission collide with other allocations or measurement gap. It may also handle situations when the scheduling grant is assumed to be lost.

The UL scheduler 310 further comprises a link adaptation function 330. The link adaptation function 330 e.g. handles transport format selection for uplink data transmission based on the channel quality of the RBs where the UE 120 is allocated. The output of this function is the allocated RBs, as well as the selected MCS.

The UL scheduler 310 further comprises a buffer estimation function 340. The buffer estimation function 340 handles tracking of the buffer status of UEs such as the UE 120. This function e.g. checks the HARQ process and process the Buffer Status Reports (BSRs) to update the buffer status of UEs such as the UE 120.

The UL scheduler 310 further comprises a resource allocation function 350. The resource allocation function 350 is e.g. responsible for assigning spectrum resources to UEs such as the UE 120.

The UL scheduler 310 comprises a power control function 360. The power control function 360 handles the transmit power adjustment of the UEs such as the UE 120.

Figure 4:
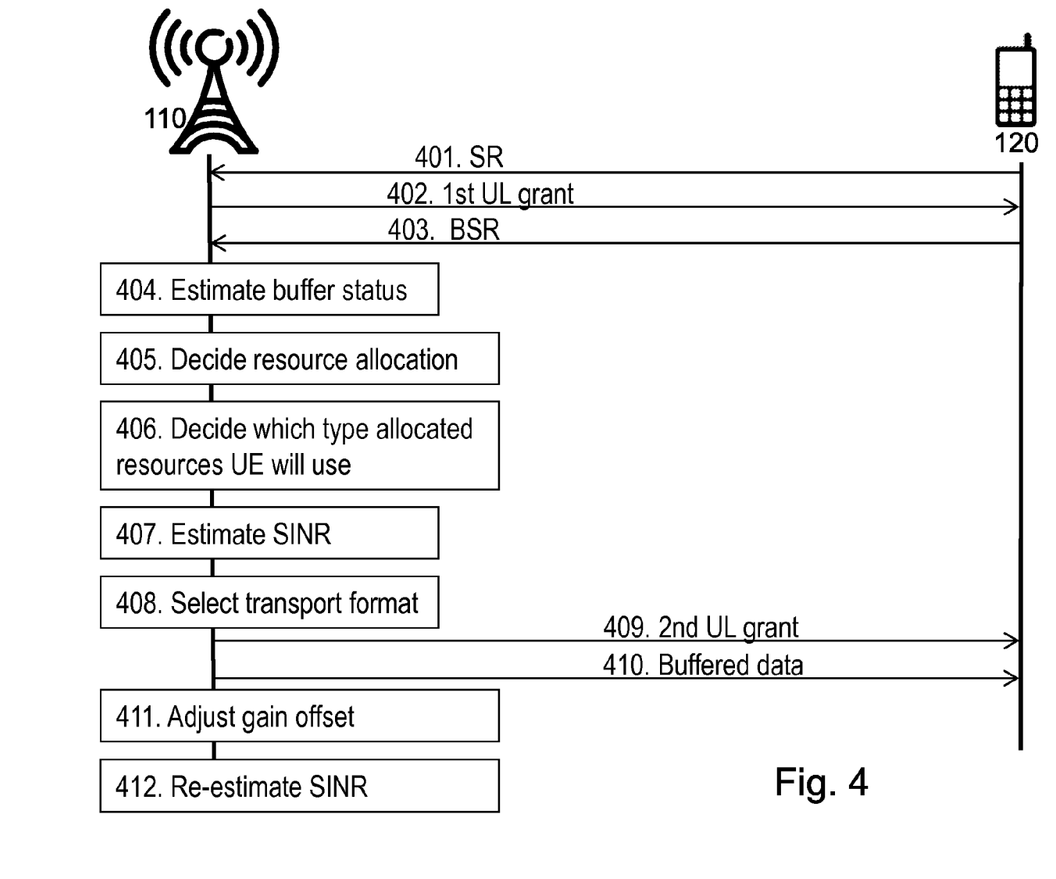
FIG. 4 is a sequence diagram illustrating embodiments of a method.

An UL transmission process between the base station 110 and the UE 120 is shown in FIG. 4.

A Scheduling Request (SR) is sent 401 to the UL scheduler 310 in the base station 110. The UL scheduler 310 in the base station 110 sends a first UL grant 402 when it finds that there are available resources that can be scheduled to this UE 120. The UE 120 then sends a Buffer Status Report (BSR) 403 to the UL scheduler 310 in the base station 110. The BSR comprises the buffer size of one of the UE's logical channel groups or of all logical channel groups.

In UL, the base station 110 does not have the full knowledge on the transmission buffer status of the UE 120. The UL scheduler 310 in the base station 110 then estimates the buffer status 404 of the UE 120, based on the buffer status information, including the SR and BSR, that is sent by the UE 120.

When the SR or BSR is received from the UE 120, the UL scheduler 310 in the base station 110 decides how to allocate resources 405 such as RBs to the UE 120 based on information such as the buffer status, the channel quality of the PUSCH, QoS requirements etc.

The UL scheduler 310 in the base station 110 then shall select a proper transport format for the allocation via link adaptation. Transport format selection is a key internal function of link adaption, and is performed based on SINR estimation, where the SINR is estimated based on Layer 1 (L1) measurements on Sounding Reference Signal (SRS) or previously received PUSCH transmissions.

To be able to make an appropriate transport format selection according to embodiments herein, the SINR is estimated by using different gain offsets for different types of allocated resources such as e.g. contiguous and non-contiguous allocated resources.

Therefore the UL scheduler 310 in the base station 110 decides 406 which type out of multiple types of allocated resources the UE 120 will use for the data transmission. To see that the base station 110 checks which one of multiple criterion that is fulfilled where each criteria is associated with one type out of the multiple types of resources. This relates to action 202 described above.

The UL scheduler 310 in the base station 110 then estimates SINR 407 by using a gain offset according to the type of allocated resources the UE 120 will use for the data transmission. This relates to action 203-205 described above.

The UL scheduler 310 in the base station 110 then selects a transport format 408 for the allocation based on the estimates SINR. This relates to action 206 described above.

The UL scheduler 310 in the base station 110 then sends to the UE 120, a second UL grant 409 including the resource allocation information and selected transport format. After receiving the second UL grant, the UE 120 transmits its buffered data 410 in the assigned resources such as the assigned RBs, using the selected transport format.

To be able to make an appropriate gain adjustment according to embodiments herein, different processes for gain adjustments are used for different types of allocated resources such as e.g. contiguous and non-contiguous allocated resources.

Thus according to embodiments herein, based on whether or not the coded transport block is correctly decoded, the UL scheduler 310 in the base station 110 performs an adjustment of the gain offset 411, which adjustment is specific to the type of allocated resources relating to the criterion that was decided to be fulfilled. This relates to action 208, 210 and 212 described above.

The UL scheduler 310 in the base station 110 may then re-estimate SINR 412 by using the adjusted gain offset. This relates to action 209, 211 and 213 described above.

An outer loop gain adjustment is an internal function of link adaption. With outer loop gain adjustment, a gain offset is adjusted based on CRCs and used in the SINR estimation.

The effective SINR for an allocation may be calculated based on the estimation on the transmit Power Spectral Density ($PSD_{tx}$) and the Gain-to-Interference and Noise Ratio (GINR) by using a Minimum Mean Square Error (MMSE) based or linear averaging methods. Both $PSD_{tx}$ and GINR are estimated per PRB basis. The GINR of the ith RB may be determined by the following equation:

$$GINR_i = Gain_i + G_{adj} - [Noise+Interference]_i$$

where all the variables are in the decibel (dB) scale, $Gain_i$ and $[Noise+Interference]_i$ denote the estimated channel gain of the PUSCH channel and the estimated noise plus interference of the ith RB, and $G_{adj}$ is the offset determined by the outer loop gain adjustment process.

Figure 5:
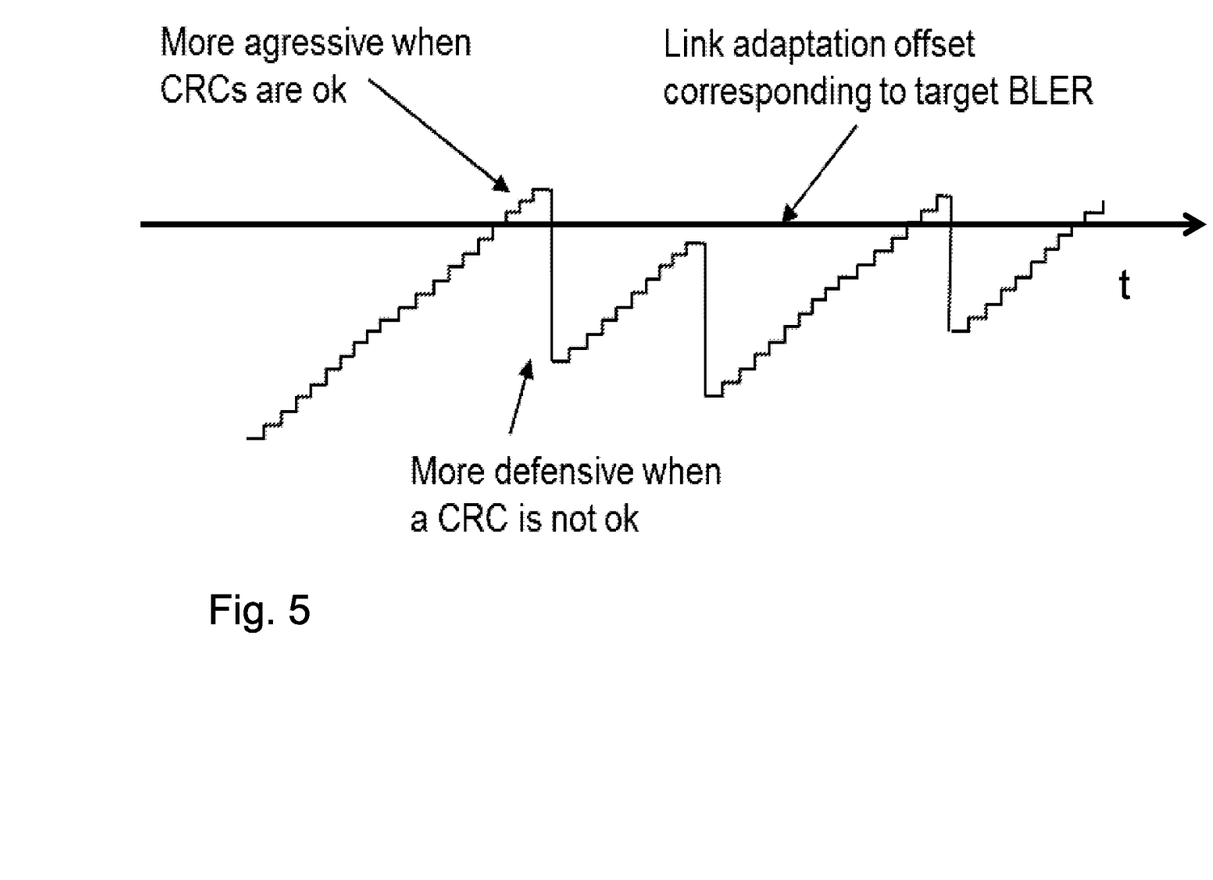
FIG. 5 is a schematic diagram illustrating embodiments herein.

FIG. 5 illustrates an example on how to adjust the offset based on CRC. In FIG. 5, the X-axis represents CRC checks (in time) of the received data transmissions, and Y-axis represents the adjustment of the gain offset. In the example of FIG. 5, the offset increases when the CRC is ok, so the transport format selection will become more aggressive. CRC ok means that the code word is correctly decoded, aggressive means selecting a higher order MCS. However, when a CRC is not ok, the offset decreases and thus the transport format selection will become more defensive. The estimated GINR is a input to the link adaptation function, and transport format is the output of this function. The transport format is selected based on the estimated GINR and the estimated Power Spectrum Density (PSD). Such kind of outer loop gain adjustment may compensate for systematic errors in SINR estimation for link adaptation.

As shown in FIG. 5, it is first checked if the CRC is ok. Then the LA offset is increased with a predefined step if the CRC is ok, and decreased with a predefined step otherwise. The ratio between the step sizes of CRC ok and not ok is determined by the target BLER.

Usually, one outer loop gain adjustment is used for one UE in the uplink. According to embodiments herein, separate outer loop gain adjustment are used for different types of resource allocations, such as for contiguous and non-contiguous resource allocations, so the accuracy on SINR estimation in the different cases can be further improved since the different transmission strategies consider different maximum power reduction (MPR), and may experience different power setting and channel quality measurement errors.

Figure 6:
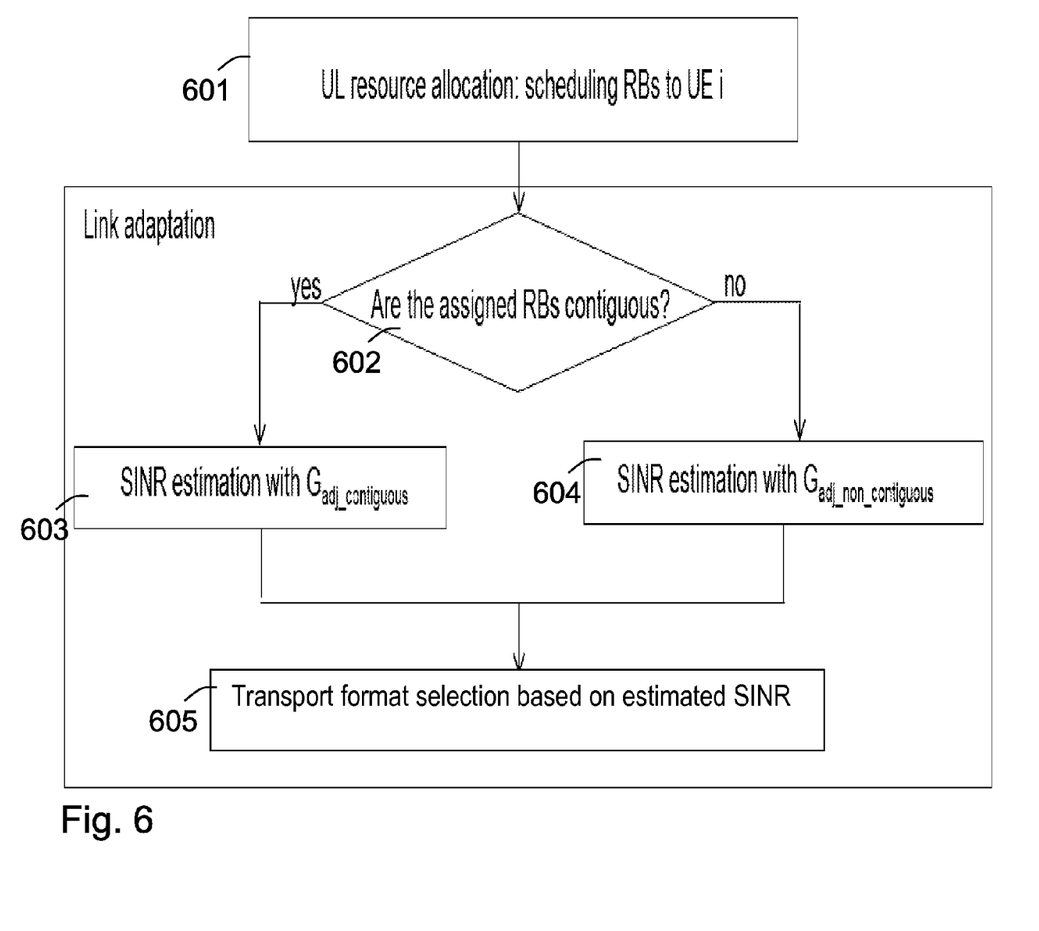
FIG. 6 is a flowchart depicting embodiments of a method in a base station.
Figure 7:
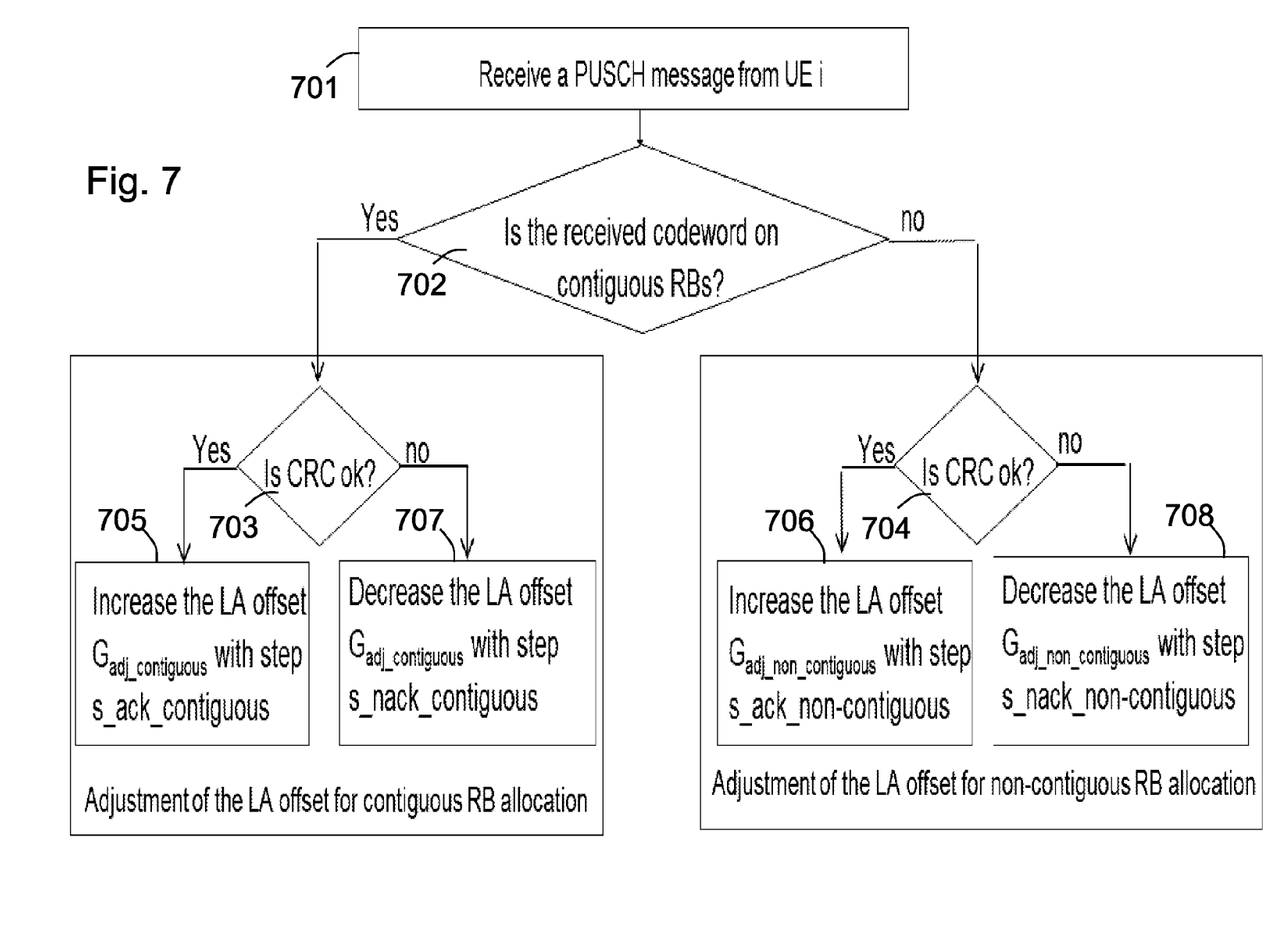
FIG. 7 is a flowchart depicting embodiments of a method in a base station.

A certain embodiment of the method is illustrated in FIG. 6 and FIG. 7, in which embodiment the first criterion relates to that that the allocated resources are contiguous, and wherein the second criterion relates to that the allocated resources are non-contiguous. FIG. 6 describes the process of selecting transport format. FIG. 6 shows LA with two separate LA offsets for contiguous and non-contiguous RB allocation. The base station 110 allocates resources 601 by scheduling resources to the UE 120. The base station 110 then checks 602 whether or not the assigned RBs are contiguous. Then in this certain embodiment, two separate LA offsets, $G_{adj\_contiguous}$ and $G_{adj\_non\_contiguous}$, are used for SINR estimation when the UE 120 is assigned with contiguous 603 or non-contiguous 604 RBs to compensate the SINR estimation error in different cases as shown in FIG. 6.

When contiguous RBs are assigned to the UE 120, the link adaption offset for contiguous RB allocation ($G_{adj\_contiguous}$) is used to compensate for systematic errors in SINR estimation.

When non-contiguous RBs are assigned to a UE, the link adaption offset for non-contiguous RB allocation ($G_{adj\_non\_contiguous}$) is used to compensate for systematic errors in SINR estimation.

The base station 110 then selects transport format 605 based on the estimated SINR.

FIG. 7 describes the updating process of the LA offsets for contiguous and non-contiguous RB allocations, which are denoted by $G_{adj\_contiguous}$ and $G_{adj\_non\_contiguous}$ respectively, according to some embodiments herein. These two offsets are used as inputs for SINR estimation for contiguous and non-contiguous RB allocations respectively as shown in FIG. 6. FIG. 7 shows two separate adjustment processes on the LA offsets for contiguous and non-contiguous RB allocations. When receiving e.g. a PUSCH message 701 from the UE 120, the base station 110 checks 702 if the code word is on contiguous RBs or non-contiguous ones to decide which LA offset that should be updated. The two offset variables may be stored in separate memories. The updating processes of the two offsets work in the same way but independently from each other, and may use different step sizes for the adjustment. As shown in FIG. 5, it is first checked if the CRC is ok 703, 704, and then the LA offset is increased 705, 706 with a predefined step if the CRC is ok, and decreased 707, 708 with a predefined step otherwise. The ratio between the step sizes of CRC ok and not ok is determined by the target BLER.

In an example embodiment herein, PUSCH transmission on contiguous or non-contiguous RBs has different MPR, and may experience different power setting error and channel quality measurement error. Two separate outer loop gain adjustment for contiguous and non-contiguous resource allocation are used according to embodiments herein to improve the accuracy on SINR estimation for link adaptation. The method is further extended to more general cases, where multiple outer loop gain adjustment processes are introduced and the criterion on selecting which one can be designed based on the parameters such as the total number of allocated RBs and also the distance between the two clusters.

Figure 8:
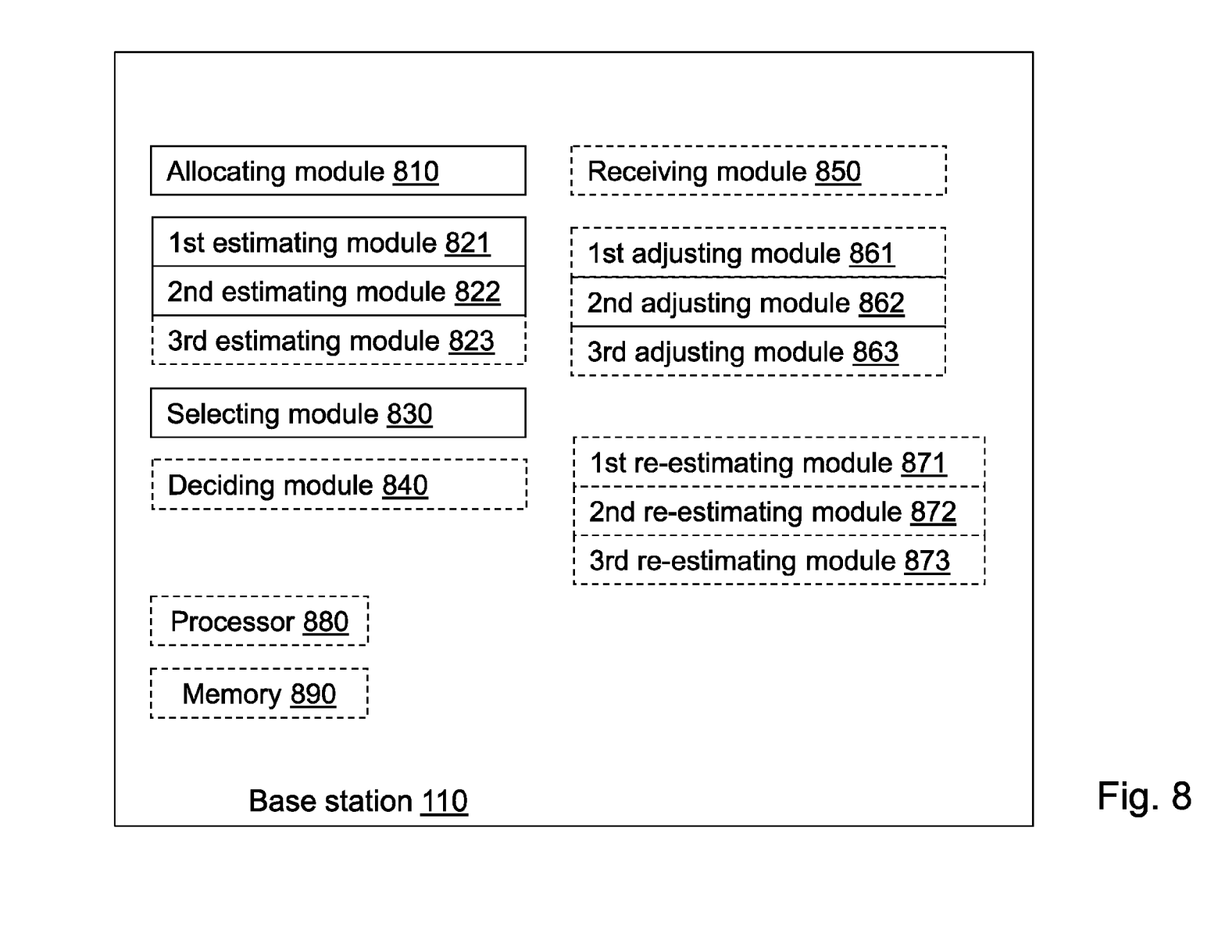
FIG. 8 is a schematic block diagram illustrating embodiments of a base station.

To perform the method actions for selecting a transport format described above, the base station 110, may comprise the following arrangement depicted in FIG. 8.

The base station 110 is configured to, e.g. by means of an allocating module 810 configured to, allocate resources to the UE 120.

The base station 110 is further configured to, e.g. by means of a first estimating module 821 configured to, when a first criterion is fulfilled for the allocated resources, estimate SINR by using a first gain offset. The first gain offset relates to a resource allocation according to the first criterion. The first criterion may relate to the allocated resources being contiguous, and the first gain offset relates to contiguous resource allocation.

The base station 110 is further configured to, e.g. by means of a second estimating module 822 configured to, when a second criterion is fulfilled for the allocated resources, estimate SINR by using a second gain offset. The second gain offset relates to a resource allocation according to the second criterion. The second criterion may relate to the allocated resources being non-contiguous, and the second gain offset relates to non-contiguous resource allocation.

In some embodiments, the multiple criterion further comprises one or more third criterion. The base station 110 may then further configured to, e.g. by means of a third estimating module 823 configured to, when a specific third criteria out of the one or more third criterion is fulfilled for the allocated resources, estimate SINR by using a specific third gain offset. The specific third gain offset relates to a resource allocation according to the specific third criterion.

The base station 110 is further configured to, e.g. by means of a selecting module 830 configured to, select a transport format for the allocated resources based on the estimated SINR.

The base station 110 may further be configured to, e.g. by means of a deciding module 840 configured to decide which one out of a multiple criterion the allocated resources fulfills. The multiple criterion comprises the first criterion and the second criterion.

The base station 110 may further be configured to, e.g. by means of a receiving module 850 configured to, receive a coded transport block from the UE 120, which coded transport block relates to the allocated resources. The receiving module 850 may be comprised in a wireless transceiver in the base station 110.

The base station 110 may further be configured to, e.g. by means of a first adjusting module 861 configured to, when the first criterion is fulfilled, adjust the first gain offset based on whether or not the coded transport block is correctly decoded.

The base station 110 may further be configured to, e.g. by means of a second adjusting module 862 configured to, when the second criterion is fulfilled, adjust the second gain offset, based on whether or not the coded transport block is correctly decoded.

The base station 110 may further be configured to, e.g. by means of a third adjusting module 863 configured to, when the specific third criteria out of the one or more third criterion is fulfilled for the allocated resources, adjust the specific third gain offset based on whether or not the coded transport block is correctly decoded.

The base station 110 may further be configured to, e.g. by means of a first re-estimating module 871 configured to, re-estimate SINR by using the adjusted first gain offset.

The base station 110 may further be configured to, e.g. by means of a second re-estimating module 872 configured to, re-estimate SINR by using the adjusted second gain offset.

The base station 110 may further be configured to, e.g. by means of a third re-estimating module 873 configured to, re-estimate SINR by using the adjusted specific third gain offset.

The base station 110 may further be configured to, e.g. by means of the receiving module 850 configured to, receive a coded transport block from the UE 120. The coded transport block relates to the allocated resources.

In some embodiments, the resource allocation is associated with a parameter, which parameter relates to any one or more out of: the amount of allocated resources and a distance of clusters in the allocated resources. In these embodiments, the second criterion is fulfilled when the value of the parameter exceeds a threshold.

Embodiments herein further relates to a computer program comprising instructions, which when executed by at least one processor 880 within the base station 110, cause the at least one processor 860 to perform actions 201-213.

Embodiments herein yet further relates to a carrier comprising the computer program. The wherein the carrier is one of an electronic signal, an optical signal, an electromagnetic signal, a magnetic signal, an electric signal, a radio signal, a microwave signal, or a computer-readable storage medium.

The embodiments herein may be implemented through one or more processors, such as a processor 880 in the base station 110 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 890 comprising one or more memory units. The memory 890 comprises instructions executable by the processor 880.

The memory 890 is arranged to be used to store e.g. network access credentials, data, configurations, and applications to perform the methods herein when being executed in the base station 110.

Those skilled in the art will also appreciate that the modules in the base station 110, described above may refer to a combination of analog and digital circuits, and/or one or more processors configured with software and/or firmware, e.g. stored in the memory 890, that when executed by the one or more processors such as the processor 880 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a base station for selecting a transport format, the method comprising:
   allocating resources to a User Equipment, UE,
   when a first criterion is fulfilled for the allocated resources where the first criterion relates to the allocated resources being contiguous, estimating Signal-to-Interference-plus-Noise Ratio, SINR, by using a first gain offset, which first gain offset relates to contiguous resource allocation,
   when a second criterion is fulfilled for the allocated resources where the second criterion relates to the allocated resources being non-contiguous, estimating SINR by using a second gain offset, which second gain offset relates to non-contiguous resource allocation, and
   selecting a transport format for the allocated resources based on the estimated SINR.

2. The method according to claim 1, further comprising:
   deciding which one out of a multiple criterion the allocated resources fulfills, and wherein the multiple criterion comprises the first criterion and the second criterion.

3. The method according claim 2, wherein the multiple criterion further comprises one or more third criterion, and wherein the method further comprises:
  when a specific third criteria out of the one or more third criterion is fulfilled for the allocated resources, estimating SINR by using a specific third gain offset, which specific third gain offset relates to a resource allocation according to the specific third criterion.

4. The method according to claim 3, further comprising:
  receiving a coded transport block from the UE, which coded transport block relates to the allocated resources,
  when the specific third criteria out of the one or more third criterion is fulfilled for the allocated resources, adjusting the specific third gain offset based on whether or not the coded transport block is correctly decoded, and
  re-estimating SINR by using the adjusted specific third gain offset.

5. The method according to claim 1, further comprising:
  receiving a coded transport block from the UE, which coded transport block relates to the allocated resources,
  when the first criterion is fulfilled, adjusting the first gain offset based on whether or not the coded transport block is correctly decoded,
  when the second criterion is fulfilled, adjusting the second gain offset, based on whether or not the coded transport block is correctly decoded.

6. The method according claim 5, further comprising:
  re-estimating SINR by using the adjusted first gain offset, or
  re-estimating SINR by using the adjusted second gain offset.

7. The method according to claim 1, wherein:
  the resource allocation is associated with a parameter, which parameter relates to any one or more out of: the amount of allocated resources and a distance of clusters in the allocated resources, and wherein
  the second criterion is fulfilled when the value of the parameter exceeds a threshold.

8. A base station for selecting a transport format, the base station being configured to:
  allocate resources to a User Equipment, UE,
  when a first criterion is fulfilled for the allocated resources where the first criterion relates to the allocated resources being contiguous, estimate Signal-to-Interference-plus-Noise Ratio, SINR, by using a first gain offset, which first gain offset relates to contiguous resource allocation,
  when a second criterion is fulfilled for the allocated resources where the second criterion relates to the allocated resources being non-contiguous, estimate SINR by using a second gain offset, which second gain offset relates to non-contiguous resource allocation, and
  select a transport format for the allocated resources based on the estimated SINR.

9. The base station according to claim 8, further being configured to:
  decide which one out of a multiple criterion the allocated resources fulfills, and wherein the multiple criterion comprises the first criterion and the second criterion.

10. The base station according claim 9, wherein the multiple criterion further comprises one or more third criterion, and wherein the base station further is configured to:
  when a specific third criteria out of the one or more third criterion is fulfilled for the allocated resources, estimate SINR by using a specific third gain offset, which specific third gain offset relates to a resource allocation according to the specific third criterion.

11. The base station according to claim 10, further being configured to:
  receive a coded transport block from the UE, which coded transport block relates to the allocated resources,
  when the specific third criteria out of the one or more third criterion is fulfilled for the allocated resources, adjust the specific third gain offset based on whether or not the coded transport block is correctly decoded, and
  re-estimate SINR by using the adjusted specific third gain offset.

12. The base station according to claim 8, further being configured to:
  receive a coded transport block from the UE, which coded transport block relates to the allocated resources,
  when the first criterion is fulfilled, adjust the first gain offset based on whether or not the coded transport block is correctly decoded,
  when the second criterion is fulfilled, adjust the second gain offset, based on whether or not the coded transport block is correctly decoded.

13. The base station according claim 12, further being configured to:
  re-estimate SINR by using the adjusted first gain offset, or
  re-estimate SINR by using the adjusted second gain offset.

14. The base station according to claim 8, wherein:
  the resource allocation is associated with a parameter, which parameter relates to any one or more out of: the amount of allocated resources and a distance of clusters in the allocated resources, and wherein
  the second criterion is fulfilled when the value of the parameter exceeds a threshold.

15. A method performed by a base station for selecting a transport format, the method comprising:
  allocating resources to a User Equipment (UE);
  when a first criterion is fulfilled for the allocated resources, estimating Signal-to-Interference-plus-Noise Ratio (SINR) by using a first gain offset, which first gain offset relates to a resource allocation according to the first criterion;
  when a second criterion is fulfilled for the allocated resources, estimating SINR by using a second gain offset, which second gain offset relates to a resource allocation according to the second criterion;
  when a specific third criteria is fulfilled for the allocated resources, estimating SINR by using a specific third gain offset, which specific third gain offset relates to a resource allocation according to the specific third criterion; and
  selecting a transport format for the allocated resources based on the estimated SINR.

* * * * *